United States Patent [19]
Brown et al.

[11] Patent Number: 6,071,566
[45] Date of Patent: Jun. 6, 2000

[54] METHOD OF TREATING METALS USING VINYL SILANES AND MULTI-SILYL-FUNCTIONAL SILANES IN ADMIXTURE

[75] Inventors: Kevin Brown, Buckinghamshire, United Kingdom; Nie Tang; Jun Song, both of Lake Bluff, Ill.

[73] Assignee: Brent International PLC, Buckinghamshire, United Kingdom

[21] Appl. No.: 09/245,600

[22] Filed: Feb. 5, 1999

[51] Int. Cl.[7] .......................................................... B05D 7/14
[52] U.S. Cl. ................... 427/387; 106/14.41; 106/14.42; 106/287.1; 106/287.11; 106/287.12; 106/287.13; 106/287.14; 106/287.16; 427/318; 427/388.4; 427/409; 427/421; 427/429; 427/435; 427/327
[58] Field of Search .............................. 106/14.41, 14.42, 106/287.1, 287.11, 287.12, 287.13, 287.14, 287.16; 427/318, 327, 387, 388.4, 409, 421, 429, 435

[56] References Cited

U.S. PATENT DOCUMENTS

| Re. 34,675 | 7/1994 | Plueddemann | 106/287.1 |
| 4,689,085 | 8/1987 | Plueddemann | 106/287.14 |
| 5,108,793 | 4/1992 | van Ooij et al. | 427/327 |
| 5,292,549 | 3/1994 | van Ooij et al. | 427/382 |
| 5,433,976 | 7/1995 | van Ooij et al. | 427/327 |
| 5,750,197 | 5/1998 | van Ooij et al. | 427/318 |
| 5,759,629 | 6/1998 | van Ooij et al. | 427/384 |

FOREIGN PATENT DOCUMENTS

| 98/19798 | 5/1998 | WIPO . |
| 98/30735 | 7/1998 | WIPO . |

*Primary Examiner*—Anthony Green
*Attorney, Agent, or Firm*—Andrus, Sceales, Starke & Sawall

[57] ABSTRACT

The present invention relates to a method of treating a metal substrate to provide permanent corrosion resistance. The method comprises applying a solution containing one or more vinyl silanes in admixture with one or more multi-silyl-functional silanes to a metal substrate in order to form a coating. The method is particularly suitable for use on zinc coated surfaces.

33 Claims, No Drawings

METHOD OF TREATING METALS USING VINYL SILANES AND MULTI-SILYL-FUNCTIONAL SILANES IN ADMIXTURE

BACKGROUND OF THE INVENTION

The present invention relates to a method of metal treatment. More particularly the invention relates to a method of treating a metal substrate to provide corrosion resistance. The method comprises applying a solution containing one or more vinyl silanes in admixture with one or more multi-silyl-functional silanes to a metal substrate in order to form a coating. The method is particularly suitable for use on zinc coated surfaces.

DESCRIPTION OF RELATED ART

Most metals are susceptible to some form of corrosion, in particular atmospheric corrosion including the formation of various types of rust. Such corrosion may significantly effect the quality of such metal substrates, as well as that of the products produced therefrom. Although corrosion may often be removed from the metal substrates, these processes are often, time consuming costly and may further diminish the integrity of the metal. Where polymer coatings such as paints, adhesives or rubbers are applied to the metal substrates, corrosion of the base metal material may cause a loss of adhesion between the polymer coating and the base metal. Such a loss of adhesion between a coating layer and the base metal may likewise lead to corrosion of the metal.

Metallic coated steel sheet such as galvanized steel for example is used in many industries, including the automotive, construction and appliance industries. In most cases, the galvanized steel is painted or otherwise coated with a polymer layer to achieve a durable and aesthetically-pleasing product. Galvanized steel, particularly hot-dipped galvanized steel, however, often develops "white rust" during storage and shipment. White rust (also called "storage stain") is typically caused by moisture condensation on the surface of the galvanized steel which reacts with the zinc coating. White rust is aesthetically unappealing and impairs the ability of the galvanized steel to undergo subsequent process steps such as being painted or otherwise coated with a polymer. Thus, prior to such coating, the zinc surface of the galvanized steel must be pretreated in order to remove the white rust which is present, and prevent it from reforming beneath the polymer layer. Various methods are currently employed to not only prevent the formation of white rust during shipment and storage, but also to prevent the formation of the white rust beneath a polymer coating (e.g., paint).

It is well established that prevention of the formation of white rust on hot-dipped galvanized steel during storage and shipping can be achieved by treating the surface of the steel with a thin chromate film. While such chromate coatings do provide resistance to the formation of white rust, chromium is highly toxic and environmentally undesirable.

It is also known to employ a phosphate conversion coating in conjunction with a chromate rinse in order to improve paint adherence and provide corrosion protection. It is believed that the chromate rinse covers the pores in the phosphate coating, thereby improving the corrosion resistance and adhesion performance. Once again, however, it is highly desirable to eliminate the use of chromate altogether. Unfortunately, however, the phosphate conversion coating is generally not effective without the chromate rinse.

Aluminium alloys are particularly susceptible to corrosion as the alloying elements used to improve the metal's mechanical properties (e.g., copper, magnesium and zinc) will decrease corrosion resistance.

Recently various techniques for eliminating the use of chromate have been proposed. These include the steps of providing an aqueous alkaline solution comprising an inorganic silicate and a metal salt in an amount to coat a steel sheet, followed by treating the silicate coating with an organofunctional silane (U.S. Pat. No. 5,108,793).

U.S. Pat. No. 5,292,549 teaches the rinsing of metal sheet with an aqueous solution containing low concentrations of an organofunctional silane and a cross linking agent in order to provide temporary corrosion protection. The cross-linking agent cross-links the organofunctional silane to form a denser siloxane film. The ratio range of silane to cross-linker is 20:1–2:1.

WO 98/30735 discloses a method of preventing corrosion using 2 treatment solutions, applied separately. The first solution employs a multi-functional silane cross-linker while the second solution employs an organofunctional silane.

U.S. Pat. No. 5,433,976 teaches the rinsing of a metal sheet with an alkaline solution containing a dissolved silicate or aluminate, an organofunctional silane and a cross-linking agent in order to form an insoluble composite layer containing siloxane.

WO 98/19798 relates to a method of preventing corrosion or metal sheet effected by the application of a solution containing one or more hydrolyzed vinyl silanes to the metal sheet. The method is particularly useful as a pretreatment step prior to painting of galvanized steel as the vinyl functionalities promote the adhesion between the metal surface and the paint coating. A disadvantage, however, is that the vinyl silanes, per se, do not bond particularly well to the metal surface.

U.S. Pat. No. Re. 34, 675 (re-issue of U.S. Pat. No. 4,689,085) describes coupling agent and primer compositions which comprise a conventional silane coupling agent and bis (trialkoxy) organo compound, and partially hydrolyzed products of such mixtures. These are used in the coupling of metal to glass and certain resins.

SUMMARY OF THE INVENTION

It is an object of the present invention to provide a method of providing a long-term corrosion resistant coating for a metal substrate.

It is a further object of the present invention to provide a method of providing a long-term coating which promotes the adhesion of the metal substrate to a polymer.

It is another object of the present invention to provide a method of providing a long-term coating for improving adhesion of a metal substrate to a polymer which employs a single-step treatment process.

It is a further object of the present invention to provide a treatment solution for providing a long-term coating for corrosion resistance to metal substrate, wherein the treatment composition need not be removed prior to painting.

The foregoing objects may be accomplished, in accordance with one aspect of the present invention, by providing a method of treating a metal substrate, comprising of the steps of:

(a) providing a metal substrate, the said metal substrate chosen from the group consisting of:
  steel;
  steel coated with a metal chosen from the group consisting of: zinc, zinc alloy, aluminium and aluminium alloy;
  iron;

zinc and zinc alloys;
aluminium; and
aluminium alloy; and (b) applying a permanent coating on the metal substrate by contacting the metal substrate with a solution containing one or more hydrolyzed or partially hydrolyzed vinyl silanes, one or more hydrolyzed or partially hydrolyzed multi-silyl-functional silanes and a solvent and substantially removing the solvent.

The present invention is particularly suitable if, subsequent to treatment of the metal substrate being carried out, the metal substrate is to be painted or coated with a polymer such as a paint, adhesive or rubber. This may take place after one or more silane coating treatments, and advantageously after curing of said silane treatment(s).

DETAILED DESCRIPTION OF THE PREFERRED EMBODIMENTS

The applicants have found that corrosion of metal, particularly steel coated with a metal chosen from the group consisting of zinc or zinc alloy, aluminium coated with a metal chosen from the group consisting of zinc or zinc alloy and aluminium alloy coated with a metal chosen from the group consisting of zinc or zinc alloy, and iron coated with a metal chosen from the group consisting of zinc or zinc alloy, can be limited by applying a treatment solution containing one or more hydrolyzed or partially hydrolyzed vinyl silanes to said metal, wherein the treatment solution additionally contains one or more multi-silyl-functional silanes, having either 2 or 3 trisubstituted silyl groups, to the metal, wherein the multi-silyl-functional silane(s) has been at least partially hydrolyzed.

The provision of such a long-term corrosion resistant coating is surprisingly superior to conventional chromate based treatments, and avoids the chromium disposal problem. In addition, the coating provides superior adhesion of the metal substrate to paint, rubber, adhesive or other polymer layers.

The method of the present invention also provides a long-term coating for corrosion resistance which resists being washed off or otherwise removed prior to the application of a coating of subsequent layer such as paint, adhesive, rubber or other polymer coating.

As used herein, the term "vinyl silane" means a silane having a trisubstituted silyl group, wherein the substituents are individually choosen from the group consisting of alkoxy and acetoxy; and a vinyl moiety.

As used herein, the term "multi-functional silane" means a silane having two or three trisubstituted silyl groups (i.e., bis- or tris-functional) wherein the substituents are individually chosen from the group consisting of alkoxy and acetoxy.

As used herein, the term "substituted" aliphatic or aromatic means an aliphatic or aromatic group wherein the carbon backbone may have a heteroatom located within the backbone or a heteroatom or heteroatom containing group attached to the carbon backbone.

The treatment methods of the present invention may be used on any of a variety of metal substrates including particularly cold-rolled steel, steel coated with a metal chosen from the group consisting of zinc, zinc alloy, aluminium and aluminium and aluminium alloy, aluminium and aluminium alloy per se, and iron.

The method of the present invention is effected by applying a treatment solution containing one or more hydrolyzed or partially hydrolyzed vinyl silanes to said metal, wherein the treatment solution additionally contains one or more multi-silyl-functional silanes having either 2 or 3 trisubstituted silyl groups to the metal, wherein the multi-silyl-functional silane(s) has been at least partially hydrolyzed.

The preferred vinyl silanes which may be employed in the present invention each have a single trisubstituted silyl group, wherein the substituents are individually chosen from the group consisting of alkoxy, aryloxy and acyloxy. Thus, the vinyl silanes which maybe used in the present invention may have the general structure

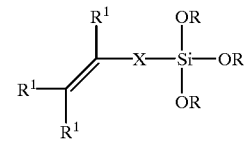

R is chosen from the group consisting of hydrogen, $C_1$–$C_{24}$ alkyl, preferably $C_1$–$C_6$ alkyl, $C_2$–$C_{24}$ acyl, preferably $C_2$–$C_4$ acyl, and may be the same or different. Preferably R is individually chosen from the group consisting of hydrogen, ethyl, methyl, propyl, iso-propyl, butyl, iso-butyl, sec-butyl ter-butyl and acetyl.

X is a group selected from the group consisting of a bond, a substituted or unsubstituted aliphatic or aromatic group. Preferably X is selected from the group chosen from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene Each $R^1$ is a group individually selected from the group consisting of hydrogen, $C_1$–$C_6$ alkyl, $C_1$–$C_6$ alkyl substituted with at least one amino group, $C_1$–$C_6$ alkenyl, $C_1$–$C_6$ alkenyl substituted with at least one amino group, arylene and alkylarylene. Preferably $R^1$ is individually selected from the group consisting of hydrogen, ethyl, methyl, propyl, iso-propyl, butyl, iso-butyl, sec-butyl ter-butyl and acetyl.

Some of the preferred vinyl silanes used in the present invention have the structures:

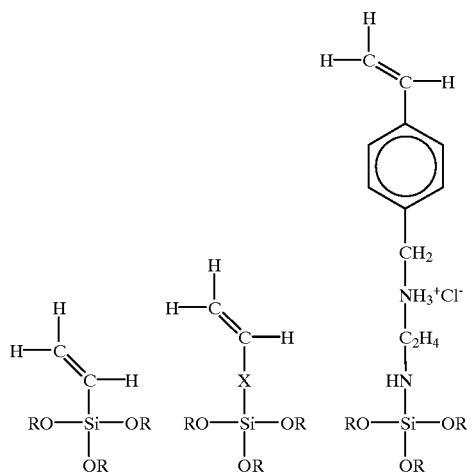

The particular preferred vinyl silane employed in the method of the present invention is vinyl triethoxy silane, which will be referred to as VS, and having the structure:

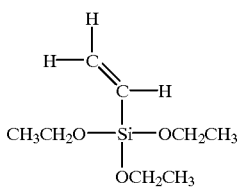

More than one multi-silyl-functional silane may be employed in the treatment solution. The, or each multi-silyl-functional silane has at least 2 trisubstituted silyl groups, wherein the substituents are individually chosen from the group consisting of alkoxy and acyloxy. Preferably the multi-silyl-functional silane of the present invention has the general structure

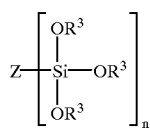

wherein z is selected from the group consisting of either a bond, an aliphatic or aromatic group; each $R^3$ is an alkyl or acyl group, and n is 2 or 3.

Each $R^3$ is chosen from the group consisting of hydrogen, $C_1$–$C_{24}$ alkyl, preferably $C_1$–$C_6$ alkyl, $C_2$–$C_{24}$ acyl, preferably $C_2$–$C_4$ acyl, and may be the same or different. Preferably each $R^3$ is individually selected from the group consisting of ethyl, methyl, propyl, iso-propyl, butyl, iso-butyl, sec-butyl, ter-butyl and acetyl.

Preferably Z is selected from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene. In the case where z is a bond, the multi-functional silane comprises two trisubstituted silyl groups which are bonded directly to one another. The preferred multi-functional silane is 1,2-bis-(triethoxysilyl)ethane, referred to as BTSE and having the structure:

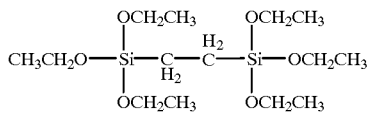

Other suitable multi-functional silanes include 1,2-bis-(trimethoxysilyl)ethane (TMSE), and 1,6-bis-(trialkoxysilyl)hexanes (including 1,6-bis-(trimethoxysilyl)hexanes), 1,2-bis-(triethoxysilyl)ethylene, 1,4-bis-(trimethoxysilylethyl)benzene, and bis-(trimethoxysilylpropyl)amine.

The above-described vinyl and multi-functional silanes must be at least partially, and preferably fully hydrolyzed so that the silanes will bond to the metal surface. During hydrolysis, the alkyl or acyl groups (i.e., the "R" and "$R^3$" moieties) are replaced with a hydrogen atom. As used herein, the term "partially hydrolyzed" simply means that only a portion of the alkyl, acyl or aryl groups on the silane have been replaced with a hydrogen atom. The silanes should preferably be hydrolyzed to the extent that at least two of the alkyl or acetyl groups on each molecule have been replaced with a hydrogen atom. Hydrolysis of the—silanes may be accomplished merely be mixing the silanes with water, and optionally including a solvent such as an alcohol in order to improve solubility.

The pH of the solution is also preferably maintained below about 7, and, most preferably between about 3 and about 6, in order to improve hydrolysis. The pH may be adjusted, for example, by the addition of an acid, such as acetic, oxalic, formic or propionic acid. If the pH is permitted to increase above about 7, the hydrolyzed multi-functional silane may begin to polymerize via a condensation reaction. It this is permitted to occur, the corrosion resistance will be significantly reduced since the silane may not bond strongly to the metal surface.

The concentration of multi-silyl-functional silanes such as BTSE in the solution should be between about 0.1% and about 10%, preferably greater than 0.1%. More preferably, a concentration of between about 1% and about 5%, most preferably about 4% is preferred.

The concentration of vinyl silanes in the solution should be between about 0.1 and 10%. More preferably, a concentration of between about 1% and about 4%, most preferably about 2% is preferred.

The ratio between the vinyl silanes and the multi-silyl-functional silanes is essential to the efficacy of the present invention in providing long-term corrosion resitance. The term "long-term" as used herein is relative to "temporary corrosion protection" coating, such as that disclosed in the patent U.S. Pat. No. 5,292,549, in which it claimed "the siloxane film may be removed by rinsing the metallic coated steel sheet in an alkaline solution prior to coating the sheet with a phosphate conversion coating and a paint." In the context of corrosion resistance "long-term" means a coating which resists being washed off or removed. The present invention shows superior properties on metal surface and resists being removed by alkaline solution. This aspect can be assessed by using an alkaline rinse solution, as set out in Example 3, to try to remove the coatings of the present invention. The ratios of vinyl silanes to multi-silyl-functional silanes used in the present invention are 4:1–1:8, preferably 2:1–1:4, more preferably a ratio of 1:2.

Although a more concentrated solution will provide a greater film thickness on the metal, this comes at the expense of increased cost. In addition, thicker films are often weak and brittle. The film thickness is generally in the range of 0.2–2 μm.

It should be noted that the concentration of silanes discussed and claimed herein are all measured in terms of the ratio between the amount of unhydrolyzed, multi-functional silanes employed (i.e., prior to hydrolyzation, and the total volume of treatment solution components (i.e., silanes, water, optional solvents and pH adjusting acids). In addition, the concentrations refer to the total amount of unhydrolyzed multi-functional silanes added, as multiple silanes may optionally be employed in this treatment solution.

The solution temperature is not critical. Temperatures down to 0° C. should be satisfactory. There is no need to heat the solution but a temperature of between 15 and 40° C. will be satisfactory. Higher temperatures may cause polymerization of the silane (i.e. they may shorten the bath life) and will have no benefit. Since the solubility in water of some of the silanes used may be limited, the treatment solution may optionally include one or more solvents, such as alcohols, in order to improve silane solubility. The alcohol may also improve the stability of the treatment solution, as well as the wettability of the metal substrate. The use of alcohols or other non-aqueous solvents such as acetone is also particularly useful for metal substrates which are prone to corrosion upon contact with water (such as galvanic corrosion of certain alloys, including CRS). Particularly preferred alcohols include: methanol, ethanol, propanol, butanol and isomers thereof. The amount employed will depend upon the solubility of the particular multi-functional silanes in the treatment solution and thus the concentration range of alcohol to water in the treatment solution of the present invention is in the ratio of 1:99 to 99:1, (by volume). There should be sufficient water to ensure at least partial hydrolysis of the silane, and thus it is preferable that at least 5 parts of water be employed for every 95 parts of alcohol. Alcohols may, however, be omitted entirely if the silane(s) is soluble in water. When alcohols are employed, methanol and ethanol are the preferred alcohols.

The preparation method itself is straightforward. The unhydrolyzed vinyl silanes are prehydrolyzed by diluting with water to obtain a desired concentration. The pH may be adjusted using an acid as described above. The BTSE is prehydrolyzed by using a similar method and the solution are mixed and the pH be adjusted using acid. Alcohol may optionally be employed to aid solubility or stability as required.

The metal substrate to be treated is preferably solvent and/or alkaline cleaned (by techniques well-known in the prior art) prior to application of the above-described treatment composition of the present invention. The treatment solution, however, can be maintained at room temperature. The treatment solution may then be applied to the cleaned metal by either dipping the metal into the solution (also referred to as "rinsing"), spraying the solution onto the surface of the metal, or even wiping or brushing the treatment solution onto the metal substrate. Indeed any method which leaves a substantially even film on the surface may effectively be employed. When the preferred application method of dipping is employed, the duration of dipping is not critical, as it will generally not affect the resulting film thickness. It is preferred that the dipping time be between about 2 seconds and about 50 minutes, preferably between about 5 seconds and 2 minutes to ensure complete coating of the metal.

If the metal is not to be coated with a polymer such as paint, and particularly in the case of aluminium and aluminium alloys, the silane coating should advantageously be cured following the application process described above. Curing will polymerize the hydrolyzed silanol groups. Alternatively, the metal may be blown dry or dried in place.

The silane treatment coating may also be cured at a temperature of between about 40° C. and 180° C. The curing time is dependant upon the curing temperature although this time is not crucial. It is sufficient just to dry the article in the shortest possible time. Lower temperatures would excessively lengthen drying times. After curing, a second treatment solution maybe applied or the first treatment solution may be reapplied, and cured if desired. Curing times may be between 0.5 minutes and 1 hour but preferably a curing period of between about 1 minute and 5 minutes is used. Curing will eventually take place even at room temperatures over a sufficient period of time. Following the cure, a second coating of the silane treatment solution may be applied, and then cured in the same manner.

The examples below demonstrate some of the superior and unexpected results obtained by employing the methods of the present invention.

EXAMPLE 1

Pretreatment on Zenzemire and Galvanize

Galvanized and Zenzemire substrates from Bammens were treated with a VS/BTSE solution. The silane solution was used to treat the metals and the treated samples were painted with a polyester powder paint. A comparison was carried out between the VS/BTSE treatment and the on-line treatment used by Bammens (cleaner and chrome treatment) by means of salt spray test (2 weeks). The test results are given in Table 1. The solution contained 4% VS, 1% BTSE, 8% ethanol, 0.01% acetic acid and 87% deionised water.

TABLE 1

| Salt spray test results of Bammens samples | | |
|---|---|---|
| Sample | Vinyl/BTSE Creepage, mm | On-line treatment Creepage, mm |
| Galvanized | 0.7 ± 0.4 | 2.0 ± 0.7 |
| Zenzemire | 1.4 ± 0.9 | 10.4 ± 3.2 |

EXAMPLE 2

Passivation

VS/BTSE was used to treat ACT HDG G70 panels. The panels were tested by salt spray, Table 2 showed the test result. The treatment solutions used were:
1. VS 2% vol.+BTSE 4% vol., pH=4
2. VS 1% vol.+BTSE 2% vol., pH=4

TABLE 2

| Salt Spray Test Results on HDG G70, no paint, only treated with VS/BTSE | | |
|---|---|---|
| | Time (hrs) | White Rust % |
| 1 | 24 | <5 |
| 2 | 24 | <10 |

EXAMPLE 3

Long-Term Corrosion Resistance Assessment

CRS, HDG 70G and aluminium 3003 were selected as test substrate. Alkaline cleaner Brent Chem clean 1111 (AC1111) which is similar to Parker 338, was selected as cleaner for CRS and HDG. The substrates were rinsed in AC 1111 (at 15 g/l) for 2 minutes at 140° F. Because a strong, uninhibited alkaline cleaner, such as AC1111, will attack and dissolve aluminium, AC 1220 was selected to clean aluminium 3003. The AC 1220 was used at 5% by volume at 130° F. The substrates were treated with VS/BTSE solution (VS 1% vol.+BTSE 2% vol., pH=4), then cured at 220° F. for 30 minutes. Infrared spectroscopy was considered to be one of the most powerful tools for the study of molecular structure and composition for years. It is well documented that siloxane group has a unique absorption at about 1000 $cm^{-1}$ in IR spectrum. Therefore, Nicolet AVATAR-360 FTIR was used to characterized the films deposited on metal surface by VS/BTSE before and after alkaline clean. After IR spectra were collected, these substrates were washed in the cleaner specified above. The IR spectra were collected again. The spectra before and after the clean for the same treatment and the same substrate were compared. If the absorption of siloxane group disappears after the clean, it indicates the siloxane film is removed.

Evaluation Results:

IR spectra indicated that alkaline cleaner can not remove those siloxane films on CRS and HDG and silicate cleaner can not remove the siloxane films on aluminium, neither.

The results are shown in Table 2.

TABLE 2

Appearance of Siloxane Absorption in IR Spectrum

|  | Aluminium | | HDG | | CRS | |
|---|---|---|---|---|---|---|
|  | Before | After | Before | After | Before | After |
| Y-APS/BTSE | Yes | Yes | Yes | Yes | Yes | Yes |

EXAMPLE 4

Coil-coat Applications on Three Substrates

VS/BTSE was treated on ACT CRS, Baycoat Hot Dipped Galvanized Steel (HDG) and Galvalume® panels. The control panels were B1000 P60 DIW for CRS, Chromate treatment on Baycoat production line for HDG and Galvalume. Galvalume panels were painted with primer (m856-016) and top coat (22-20752); HDG panels were painted with primer (PMY 0154) and top coat (SPG 0068), made by Lilly Industries; CRS panels were painted with 80G Newell White Polyester (408-1-W976), made by Specialty Coating Company. They are all polyester base paint.

Table 3 shows the corrosion test results (Salt Spray Test Results(mm) (Polyester Coil paint)) for the following compositions.

1. VS 0.5% vol.+BTSE 2% vol. pH=5
2. VS 2% vol.+BTSE 0.5% vol. pH=5
3. Control treatment

TABLE 3

Salt Spray Test Results (mm)

| Treatment Solution | Galvalume ® 744 hrs. | | HDG 1080 hrs. | CRS 336 hrs. |
|---|---|---|---|---|
|  | Edge | Scribe | Scribe | Scribe |
| 1 | 2.1 ± 0.3 | 0 | 6.8 ± 0.7 | 4.8 ± 0.3 |
| 2 | 2.4 ± 0.4 | 0 | 7.9 ± 1.1 | 8.9 ± 1.1 |
| 3 | 3.4 ± 0.6 | 0 | 7.0 ± 1.0 | 4.4 ± 0.4 |

EXAMPLE 5

Pretreatment for HDG Tubes

The treatment used to treat ACT G70 Hot Dipped Galvanized was: (1). A solution composed of 2% BTSE, 0.5% VS, 0.1% acetic acid, 6% alcohol and 91.4% deionized water. (2). A solution composed of 1% BTSE, 4% VS, 0.1% acetic acid, 3% alcohol and 91.9% deionized water. The same substrates with chromate treatment revieved from Allied Tube & Conduit Company. Allied Tube clear paint (acrylic paint) was the topcoat for the silane treated and chromate treated panels. The panels were tested in a salt spray chamber until the first sign of white rust was showed on the HDG surface. Table 4 shows the test results.

TABLE 4

Salt spray test results of Allied clear painting HDG panels.

| Treatment | Time before white rust |
|---|---|
| 1 | 312 hours |
| 2 | 240 hours |
| Chromate | 168 hours |

What is claimed is:

1. A method of improving corrosion resistance of a metal substrate, comprising of the steps of:
    (a) providing a metal substrate, said metal substrate selected from the group consisting of steel coated with zinc, steel coated with a zinc alloy, iron coated with zinc, iron coated with a zinc alloy, aluminum coated with zinc, aluminum coated with a zinc alloy, aluminum alloy coated with zinc, and aluminum alloy coated with a zinc alloy;
    (b) applying a permanent coating on the metal substrate by contacting the metal substrate with a solution containing a concentration of between about 0.1% and 10% of one or more hydrolyzed or partially hydrolyzed vinyl silanes, a concentration of between about 0.1% and 10% of one or more hydrolyzed or partially hydrolyzed multi-silyl-functional silanes and a solvent capable of dissolving the silanes; and
    (c) substantially removing the solvent.

2. The method according to claim 1, further comprising the step of curing said coating after step (b) at a temperature of between about 40° C. and 180° C.

3. The method according to claim 1, further comprising the step of applying a second treatment solution containing a concentration of between about 0.1% and 10% of one or more hydrolyzed or partially hydrolyzed vinyl silanes and a concentration of between about 0.1% to 10% of one or more hydrolyzed or partially hydrolyzed multi-silyl-functional silanes to said metal sheet.

4. The method according to claim 1, further comprising the step of applying a second treatment solution containing a concentration of between about 0.1% to 10% of one or more hydrolyzed or partially hydrolyzed organofunctional silanes.

5. The method according to claim 1 wherein the vinyl silanes have the general structure $$\begin{array}{c} R^1 \\ \diagup \\ R^1 \end{array} \!\!=\!\! \begin{array}{c} R^1 \\ \diagdown \\ R^1 \end{array} \!\!-\!\! X \!\!-\!\! \underset{\underset{OR}{|}}{\overset{\overset{OR}{|}}{Si}} \!\!-\!\! OR$$

R is selected from the group consisting of hydrogen, $C_2$–$C_{24}$ alkyl, and $C_2$–$C_{24}$ acyl X is selected from the group consisting of a bond, a substituted $C_1$–$C_{24}$ aliphatic group, an unsubstituted $C_1$–$C_{24}$ aliphatic group, a substituted $C_1$–$C_{24}$ aromatic group, and an unsubstituted $C_1$–$C_{24}$ aromatic group; and each $R^1$ is individually selected from the group consisting of hydrogen, a substituted $C_1$–$C_{24}$ aliphatic group, an unsubstituted $C_1$–$C_{24}$ aliphatic group, a substituted $C_1$–$C_{24}$ olefinic group, an unsubstituted $C_1$–$C_{24}$ olefinic group, a substituted $C_1$–$C_{24}$ aromatic group, and an unsubstituted $C_1$–$C_{24}$ aromatic group.

6. The method according to claim 5, wherein each R is selected from the group consisting of a $C_1$–$C_6$ alkyl or $C_2$–$C_4$ acyl group.

7. The method according to claim 5, wherein X is selected from the group consisting of a bond, $C_1$–$C_4$ alkylene, $C_1$–$C_6$ alkenylene, $C_1$–$C_4$ alkylene substituted with at least one amino group, $C_1$–$C_6$ alkenylene substituted with at least one amino group, arylene and alkylarylene.

8. The method according to claim 5, wherein each $R^1$ is a group individually selected from the group consisting of hydrogen, $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, arylene and alkylarylene.

9. The method according to claim 5, wherein wherein each $R^1$ is individually selected from the group consisting of hydrogen, ethyl, methyl, propyl, iso-propyl, butyl, iso-butyl, sec-butyl ter-butyl and acetyl.

10. The method according to claim 1, wherein the multi-silyl-functional silane has the general structure

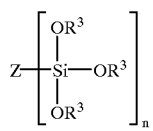

wherein Z is selected from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene; $R^3$ is selected from the group consisting of hydrogen, $C_1$–$C_{24}$ alkyl and $C_2$–$C_{24}$ acyl, and may be the same or different; and,
n is 2 or 3.

11. The method according to claim 10, wherein $R^3$ is selected from the group consisting of hydrogen, $C_1$–$C_6$ alkyl and $C_2$–$C_4$ acyl, and may be the same or different.

12. The method according to claim 11, wherein each $R^3$ is individually chosen from the group consisting of: ethyl, methyl, propyl, iso-propyl, butyl, iso-butyl, sec-butyl, ter-butyl and acetyl.

13. The method of claim 1, wherein the vinyl silane is vinyltriethoxysilane.

14. The method of claim 1, wherein the multi-silyl-functional silane is 1,2-bis-(triethoxysilyl)ethane.

15. The method according to claim 1 wherein the solution additionally comprises a concentration of between about 0.01% and 0.1% of an organic acid.

16. The method according to claim 15, wherein the acid is selected from the group consisting of acetic, oxalic, formic and propionic acid.

17. The method according to claim 1 wherein the solvent comprises an organic solvent capable of dissolving the silanes.

18. The method according to claim 17, wherein the solvent is an alcohol.

19. The method according to claim 1, wherein the solvent comprises water.

20. The method of claim 1, wherein a polymer coating is applied on top of the silane coating.

21. The method of claim 20, wherein the polymer coating is selected from the group consisting of paint, rubber and adhesive.

22. The method of claim 1 wherein the concentration of multi-silyl-functional silanes in the solution is between about 0.4% and about 3%.

23. The method of claim 1, wherein the concentration of vinyl silanes in the solution is between about 0.2% and about 2%.

24. The method of claim 1, wherein the vinyl silanes and multi-silyl-functional silanes are present in the solution in a ratio in the range of 4:1–1:8.

25. The method of claim 1, wherein the step of applying the coating to the metal substrate is performed by dipping the substrate into the coating and retaining the substrate in the coating for a specified dipping time, the dipping time of the metal substrate in the treatment solution being between about 2 seconds and about 50 minutes.

26. The method of claim 1 wherein the concentration of the multi-silyl-functional silanes in the solution is about 2%.

27. The method of claim 1 wherein the concentration of the vinyl silanes in the solution is about 1%.

28. The method of claim 1 wherein the vinyl silanes and multi-silyl-functional silanes are present in the solution in a ratio in the range of 2:1–1:4.

29. The method of claim 1 wherein the vinyl silanes and multi-silyl-functional silanes are present in the solution in a ratio of about 1:2.

30. The method of claim 25 wherein the dipping time is between about 0.5 minutes and 2 minutes.

31. A composition comprising at least one vinyl silane and at least one multi-silyl-functional silane, wherein the vinyl silanes and the multi-silyl-functional silanes are present in the solution in a ratio in the range of 4:1–1:8.

32. The composition of claim 31 wherein the vinyl silanes and multi-silyl-functional silanes are present in the solution in a ratio in the range of 2:1–1:4.

33. The composition of claim 31 wherein the vinyl silanes and multi-silyl-functional silanes are present in the solution in a ratio of about 1:2.

* * * * *